(12) United States Patent
Ishibashi

(10) Patent No.: US 6,721,832 B2
(45) Date of Patent: Apr. 13, 2004

(54) DATA PROCESSING SYSTEM AND BUS CONTROL METHOD FOR STREAM DATA TRANSFER

(75) Inventor: Yasuhiro Ishibashi, Ome (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 501 days.

(21) Appl. No.: 09/772,869

(22) Filed: Jan. 31, 2001

(65) Prior Publication Data

US 2001/0054125 A1 Dec. 20, 2001

(30) Foreign Application Priority Data

Feb. 2, 2000 (JP) ........................................ 2000-025475

(51) Int. Cl.[7] ............................................... G06F 13/42
(52) U.S. Cl. ........................ 710/107; 710/35; 710/105; 713/400; 370/464
(58) Field of Search ........................... 710/107, 63, 64, 710/35, 315, 117, 105; 455/557; 711/100, 163; 713/400; 370/257, 423, 464; 709/239, 250, 253

(56) References Cited

U.S. PATENT DOCUMENTS

| 5,029,124 A | * | 7/1991 | Leahy et al. |
| 5,717,954 A | * | 2/1998 | Grieff et al. |
| 5,751,987 A | * | 5/1998 | Mahant-Shetti et al. |
| 5,974,467 A | * | 10/1999 | Haddock et al. |
| 6,088,366 A | * | 7/2000 | Sung |

* cited by examiner

*Primary Examiner*—Gopal C. Ray
(74) *Attorney, Agent, or Firm*—Finnegan, Henderson, Farabow, Garrett & Dunner, L.L.P.

(57) ABSTRACT

A data processing system includes a bus, a plurality of devices connected to the bus, and a unit for executing data transfer between at least two of the plurality of devices via the bus, using one of a first bus cycle mode that enables data transfer with handshaking operation therebetween and a second bus cycle mode that enables stream data transfer without handshaking operation therebetween.

13 Claims, 5 Drawing Sheets

FIG. 1

FIG. 2 DATA TRANSFER BY HANDSHAKING

| C/BE[3::0]# | TYPE OF COMMAND |
|---|---|
| 0000 | INTERRUPT ACKNOWLEDGE |
| 0001 | SPECIAL CYCLE |
| 0010 | I/O READ |
| 0011 | I/O WRITE |
| 0100 | RESERVED→STREAM ACCESS |
| 0101 | RESERVED |
| 0110 | MEMORY READ |
| 0111 | MEMORY WRITE |
| 1000 | RESERVED |
| 1001 | RESERVED |
| 1010 | CONFIGURATION READ |
| 1011 | CONFIGURATION WRITE |
| 1100 | MEMORY READ MULTIPLE |
| 1101 | DUAL ADDRESS CYCLE |
| 1110 | MEMORY READ LINE |
| 1111 | MEMORY WRITE AND INVALIDATE |

FIG. 3 EXPANSION OF COMMANDS

FIG. 4

CHANNEL CONTROL REGISTER IN Config

| Config Add. | Ch Cnt (8bit) | Ch No. (8bit) |
|---|---|---|
| 10 | | 2 |
| 14 | | 3 |
| 18 | | 4 |

| 7 | 6 | 5 | 4 | 3 | 2 | 1 | 0 |
|---|---|---|---|---|---|---|---|
| Ch Ava | In/Out | Reject | | | | | |

FIG. 5

FIG. 6  DATA TRANSFER BY STREAM ACCESS

FIG. 8

DATA PROCESSING SYSTEM AND BUS CONTROL METHOD FOR STREAM DATA TRANSFER

CROSS-REFERENCE TO RELATED APPLICATIONS

This application is based upon and claims the benefit of priority from the prior Japanese Patent Application No. 2000-025475, filed Feb. 2, 2000, the entire contents of which are incorporated herein by reference.

BACKGROUND OF THE INVENTION

The present invention relates to a data processing system and a bus cycle control method, and more particularly to a data processing system for handling various types of data, including audio/video data, other data, and programs, and a bus cycle control method used in the system.

With recent advances in computer technology, various digital information devices such as multimedia-compatible personal computers, set top boxes, digital TVs, and game machines have been developed. Digital information devices of this type are required to have the ability to handle various media such as broadcasting media, communication media, and storage media.

Therefore, personal computers are required to have not only the function of processing ordinary programs but also the function of dealing with AV (audio/video) stream data needing real-time processing. On the other hand, consumer AV devices such as set top boxes, digital TVs, and game machines are required to have the function of handling computer data, that is, programs and data other than A/V stream data, to implement interactive title playback using software control.

Since the bus cycle used in computers was designed to transfer the computer data exactly, it was unsuitable for the transfer of AV stream needing great band widths. For example, in a PCI (Peripheral Component Interconnect) bus, because the master and target operate while each monitoring the state of the ready signals (IRDY, TRDY) from the other party, they have to do handshaking in each clock cycle. One clock cycle on the PCI bus is about 30 ns (when the clock frequency is 33 MHz). In the handshaking operation, the master and target check the state of the ready signal from the other party and determine the operation in the next clock cycle. They are required to do such handshaking during one clock cycle.

Although the presence of such handshaking assures the reliability of the computer data, it might hinder the improvement of the band width of AV stream. The reason is that since AV data has almost no effect on the sense of sight and hearing of users because of its characteristics, even if part of the data has been lost, it is not required to have as high reliability as that of computer data.

Furthermore, in the PCI, resources (containing memory addresses, I/O addresses, or the like) of a CPU are used for addressing. Even when direct data exchange between the devices on the PCI bus is more efficient, the data is usually transferred via the CPU and memory. In the addressing method using the resources (containing memory addresses, I/O addresses, or the like) of the CPU, the register specifications and the like for the devices to be accessed are required to be clearly determined. Thus, the method is unsuitable for direct communication between devices differing in manufactures.

On the other hand, conventional AV devices were cascade-connected in the order in which the AV stream was processed, thereby physically making a peer-to-peer connection between devices handling the AV stream. Basically, the AV stream was not entered into the CPU. With the advent of titles into which the AV stream and interactive commands have fused, the CPU has recently been required to process the stream as the need arises. This makes it more difficult to make a physical peer-to-peer connection between devices as before. To overcome the difficulty, efforts have begun to be made to grope for a bus connection capable of implementing a flexible processing system.

BRIEF SUMMARY OF THE INVENTION

Accordingly, it is an object of the present invention to provide a data processing system capable of transferring stream data efficiently on an existing bus such as a PCI bus, and a bus cycle control method.

According to one aspect of the present invention, there is provided a data processing system comprising: a bus; a plurality of devices connected to the bus; and means for executing data transfer between at least two of the plurality of devices via the bus, using one of a first bus cycle mode that enables data transfer with handshaking operation therebetween and a second bus cycle mode that enables stream data transfer without handshaking operation therebetween.

According to another aspect of the present invention, there is provided a data processing system comprising: a bus; a plurality of devices connected to the bus; a system memory; and means for executing data transfer between at least two of the plurality of devices via the bus, using one of a first bus cycle mode that enables data transfer through the system memory and a second bus cycle mode that enables stream data transfer without passing through the system memory.

According to still another aspect of the present invention, there is provided a bus cycle control method applied to a data processing system in which data is transferred between devices via a bus, bus cycle on the bus being constituted by an address phase that specifies a type of the bus cycle and an address, and one or more data phases following the address phase, the method comprising the steps of: outputting onto the bus in the address phase a command indicating execution of an expansion bus cycle mode that enables stream data transfer without handshaking operation between the devices; changing the bus cycle from an ordinary bus cycle mode that enables data transfer with handshaking operation between the devices to the expansion bus cycle mode; and executing stream data transfer between devices via the bus without handshaking operation therebetween by the expansion bus cycle mode.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Hereinafter, referring to the accompanying drawings, an embodiment of the present invention will be explained.

Figure 1:
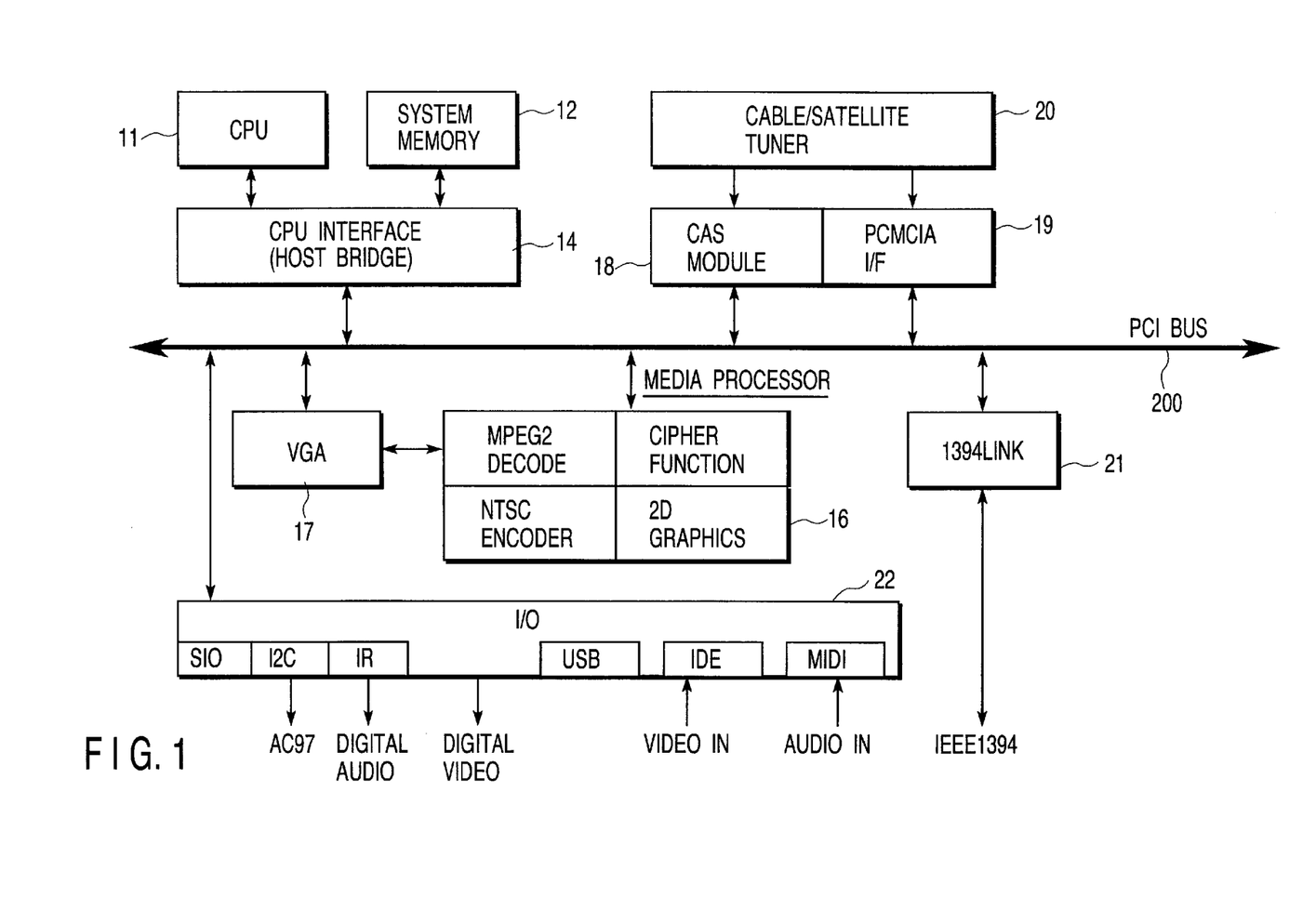
FIG. 1 is a block diagram showing the system configuration of a data processing system according to an embodiment of the present invention.

FIG. 1 shows the system configuration of a data processing system according to an embodiment of the present invention. This data processing system is a multimedia-compatible computer capable of handling various media such as broadcasting media, communication media, and storage media. In the data processing system, the function of its internal bus is expanded so as to make the program processing function compatible with the function of handling AV (audio/video) stream data at a high level. Specifically, the embodiment uses a PCI bus 200 as its internal bus, while not only an ordinary bus cycle mode in which data transfer between devices is performed with handshaking but also an expansion bus cycle mode for AV data stream transfer (hereinafter, referred to as stream access) are prepared for the bus cycle on the PCI bus 200.

The details of stream access will be explained later by reference to FIG. 3 and subsequent figures. The existing bus transactions specified by the PCI specifications are used basically without any change, while functions are expanded so that the data transfer between devices is carried out without handshaking. In stream access, wait control is not performed at all. As a result, the time for handshaking can be instead applied to the data transmitting and receiving operations, which enables stream data transfer by double edge access (described later). The bus configuration of the PCI bus 200 is the existing one specified by the PCI specifications.

System Configuration

Hereinafter, a concrete configuration of the system will be explained.

As shown in FIG. 1, the system includes a CPU 11, a system memory 12, and a CPU interface (host bridge) 14. The CPU 11, which controls the operation of the entire system, executes the operating system, various application programs, device drivers, and others on the system memory 12. The CPU interface 14 is a bus bridge for connecting a CPU bus and a PCI bus 200 bidirectionally and functions as one of the PCI devices. The CPU interface 14 includes a memory controller for controlling access to the system memory 12, a bus manager (described later) made up of software, and the like.

As shown in FIG. 1, a media processor 16, a VGA controller 17, a CAS module 18, a PCMCIA interface 19, an IEEE 1394 interface 21, and an I/O controller 22 as PCI devices are connected to the PCI bus 200.

The media processor 16 has the following functions: MPEG-2 decoding, stream ciphering, NTSC encoding, and 2D graphics operation. Control of the process of decoding and reproducing AV stream is performed by the media processor 16. The VGA controller 17 is for controlling the display monitor of the data processing system. Not only an LCD and an external CRT but also a TV may be used as the display monitor. The CAS module 18 is a dedicated interface for connecting a CATV/satellite tuner 20. The CATV/satellite tuner 20 is also connected via a PCMCIA interface 19. Of course, the CATV/satellite tuner 20 may be realized as a PCI device and connected directly to the PCI bus 200.

The I/O controller 22 includes interfaces for outputting digital video signals to external AV devices and interfaces for communicating with various peripheral devices such as an SIO interface, an I$^2$C bus interface, an IR (infrared) interface, a USB interface, an IDE interface, and an MIDI interface. Storage devices, including a DVD drive and an HDD, are connected to the I/O controller 22 via an IDE/ATAPI interface.

PCI Bus Cycle

Figure 2:
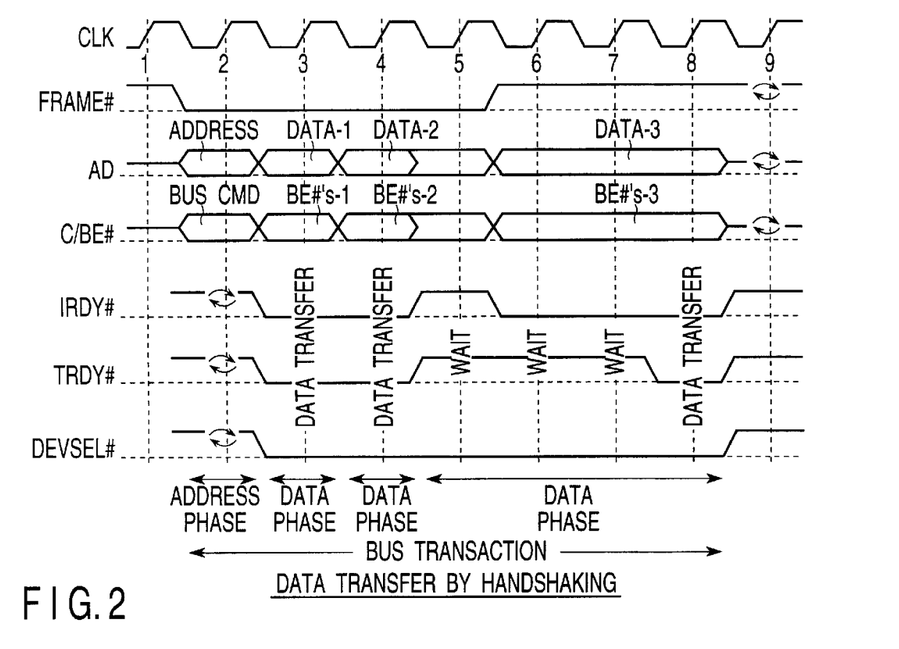
FIG. 2 is a timing chart to help explain a standard bus cycle of a PCI bus used in the embodiment.

Next, referring to FIG. 2, the ordinary bus cycle executed on the PCI bus 200 will be explained. In FIG. 2, how a bus cycle takes place in a write transaction is shown.

First, the meaning of the signal lines included in the PCI bus 200 will be described. The PCI bus 200 includes a clock signal (CLK) line, a frame signal (FRAME#) line for indicating the bus cycle period, a 32-bit address/data (AD) line, a 4-bit command/byte enable signal (C/BE#) line, an initiator ready signal (IRDY#) line for indicating the ready state of a master device (initiator), a target ready signal (TRDY#) line for indicting the ready state of a target device, and a select signal (DEVSEL) line for indicating that the target device has been selected. The symbol # represents active low signal (L signal).

The bus cycle of the PCI bus 200 is constituted by an address phase and one or more data phases following the address phase. First, the initiator (master device) that starts a bus cycle asserts a frame signal (FRAME#), thereby starting the address phase. During the address phase, the address/data (AD) line has an effective address (I/O address or memory address) on it and the C/BE# includes a valid bus command. The bus command indicates the type of bus cycle such as I/O read cycle, I/O write cycle, memory write cycle, memory read cycle, or configuration cycle. After the address phase, the data phase is started.

In the data phase, the address/data (AD) line has the valid data on it. The data is transmitted and received in synchronization with the rising edge of the clock CLK (which is called single edge access). In each data phase (or each clock cycle), IRDY# and TRDY# are checked, which enables a wait cycle to be inserted. FIG. 2 shows a case where the target has inserted three wait cycles between the second data phase and third data phase.

As described above, in the ordinary mode, the initiator and target operate in a handshaking manner in which they determine the operation for the next clock cycle by monitoring IRDY# and TRDY#.

Expansion of Bus Commands

Figure 3:
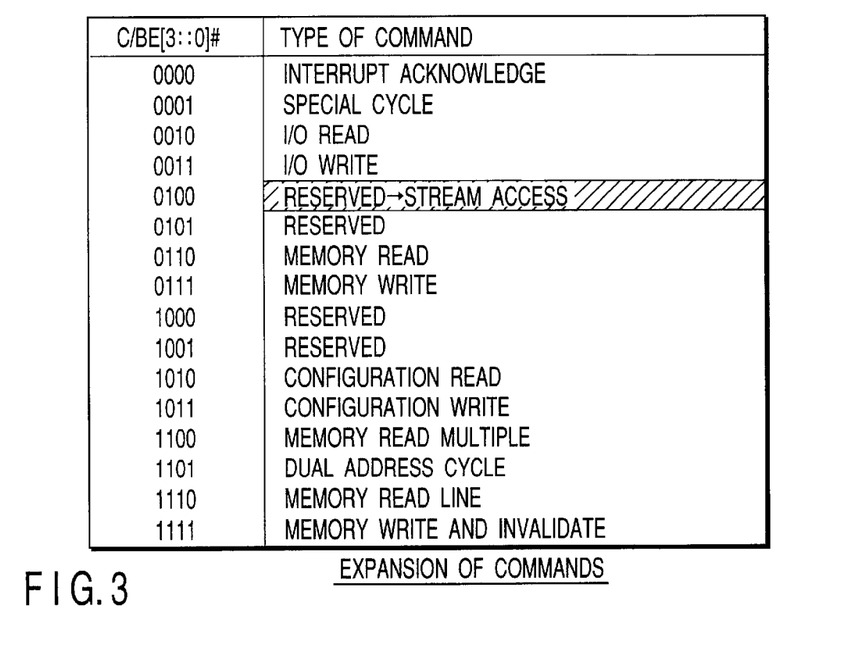
FIG. 3 is a table to help explain the definitions of bus commands used in the embodiment.

FIG. 3 shows the relationship between the bus commands specifiable in the address phase and the types (command types) of bus cycles corresponding to these commands. In the PCI specifications, the type of bus cycle is determined by the command outputted in the address phase. Of these commands, the following four, "0100," "0101," "1000," and "1001," are idle (reserved). In the embodiment, one of them is allocated to stream access. FIG. 3 shows a case where "0100" is used as an expansion command indicating stream access.

Channel

Figure 4:
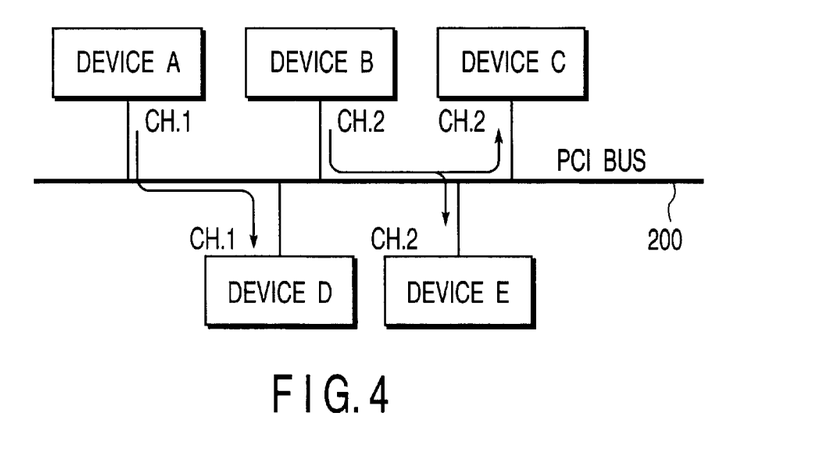
FIG. 4 is a diagram to help explain the principle of stream access used in the embodiment.

In stream access, access to a PCI device is managed using a channel number. The channel number indicates the data transfer path in stream access. Data transfer is performed by stream access between the PCI devices allocated the same channel number. To perform stream access, the master device outputs its allocated channel number onto the AD in place of the I/O address or memory address. The PCI device to which the same channel number as the channel number on the AD has been allocated becomes a target device. Channels are allocated to the individual PCI devices before the stream data is transferred. In practice, not only a channel number but also information indicating whether the device belongs to the transmission side or the reception side are allocated to each PCI device.

In FIG. 4, device A is a transmission-side device with channel number 1 and device D is a reception-side device with channel number 1. In this case, device A and device D both allocated channel number 1 form a peer-to-peer connection on the PCI bus 200 theoretically. Data transfer between them is carried out without handshaking. In this case, device A on the transmission side transmits data speculatively (or one-sidedly), regardless of the state of device B on the reception side.

Furthermore, more than one reception-side device with the same channel number as that of the transmission-side device may be set for one transmission-side device. FIG. 4 shows a case where device B is used as a transmission-side device with channel number 2 and device C and device E are used as reception-side devices with channel number 2. In this case, the stream data from device B is multicast to device C and device E.

Channel Control Register

Figure 5:
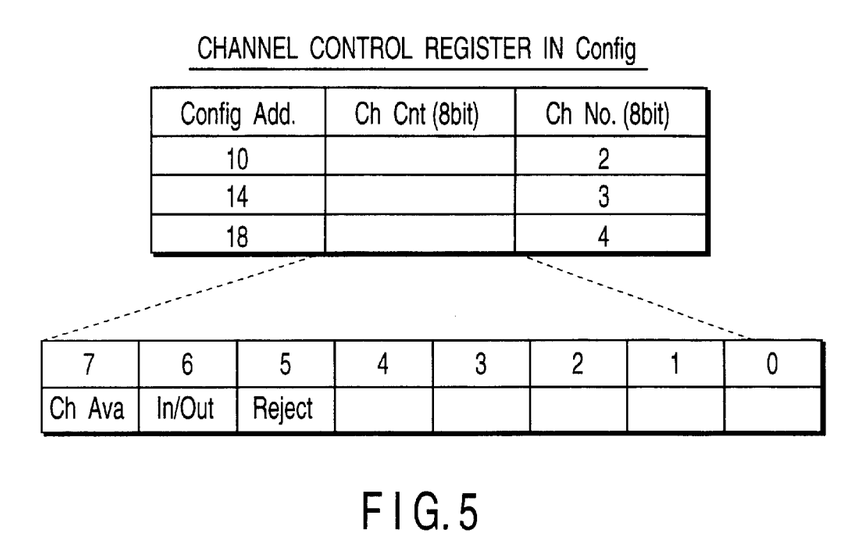
FIG. 5 shows the contents of a channel control register used in the system of the embodiment.

FIG. 5 shows the contents of the channel control register provided in the PCI device to support stream access.

The channel control register has been defined in part of the configuration space specified in the PCI specifications and can have control information about a plurality of channels. Control information about each channel is constituted by a set of channel control information (Ch Cnt) and channel number information (Ch No.). The setting of channel number information is done by a bus manager made up of software. The bus manager may be incorporated into part of the OS as an AV data processing module or implemented as a dedicated utility/device driver.

The channel control information includes channel available information (Ch Ava) indicating whether the relevant channel is valid or invalid and I/O information (In/Out) indicating whether the relevant channel is an input channel (reception-side device) or an output channel (transmission-side device).

Which node outputs or inputs the data to which channel is determined by the setting of a Config register by the bus manager (made up of software). The setting of the Config register by the bus manager is effected in the process of setting the system environment carried out at the start-up of the operating system.

Stream Access

Figure 6:
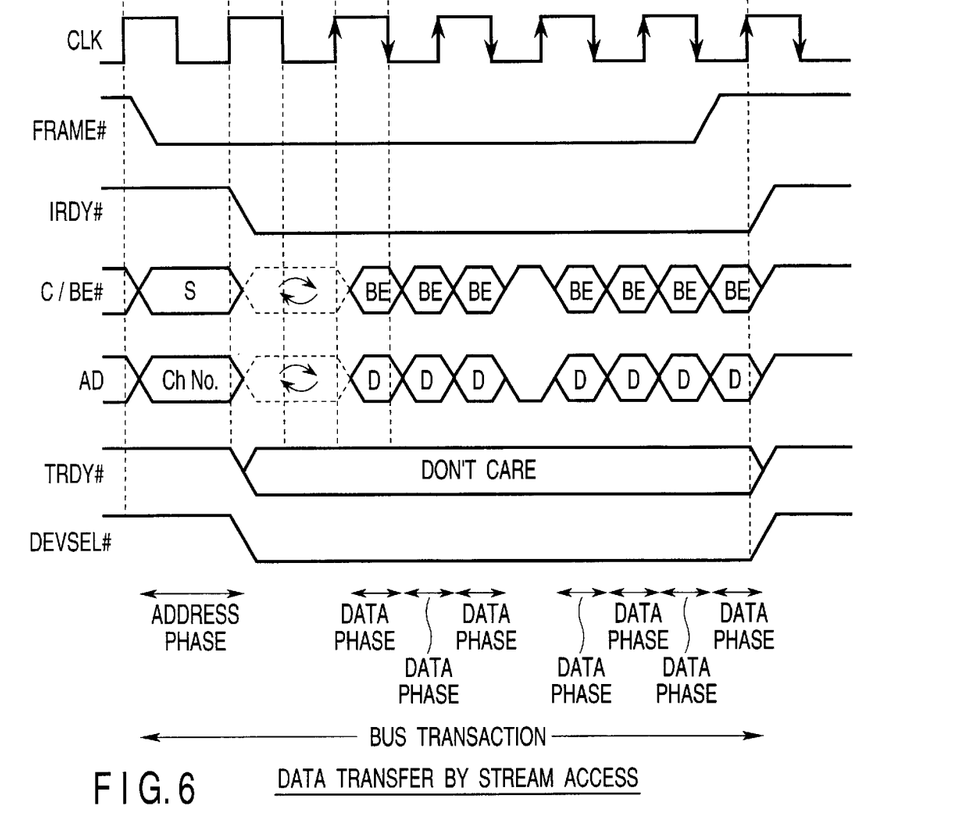
FIG. 6 is a timing chart to help explain a bus cycle in stream access used in the embodiment.

FIG. 6 shows a bus cycle in stream access. First, the initiator (master device) that starts stream access asserts a frame signal (FRAME#), thereby starting the address phase. In the address phase, the initiator outputs a valid channel number (Ch No.) onto the address/data (AD) line in place of an I/O address or memory address and a bus command (S) indicating stream access onto the C/BE# line. The PCI device specified by the channel number asserts DEVSEL# and declares that it has been selected as the target of stream access. After the address phase, the period of turnaround is obtained, if necessary, and then the data phase is started.

In the data phase, an out-side device transfers the data to an in-side device. The transmission and reception of data (D) is performed in synchronization with the rising edge and falling edge of a clock (which is called double edge access). Here, IRDY# and TRDY# are made invalid, preventing handshaking for wait control using IRDY# and TRDY# from being effected, which enables the data to be transferred continuously in synchronization with the clock in the presence of byte enable BE#.

As described above, stream access is implemented using the signals and protocol in the PCI specifications without any change.

Here, the flow of the AV stream using stream access will be explained.

Figure 7:
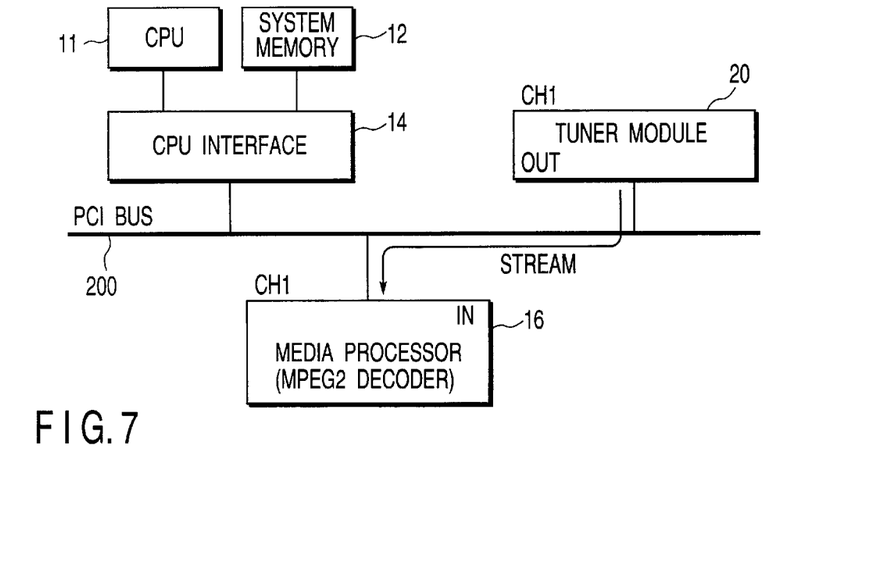
FIG. 7 shows an example of data transfer of AV stream using stream access in the embodiment.

First, referring to FIG. 7, the operation of decoding the AV stream received by the CATV/satellite tuner (tuner module) 20 and displaying the decoded data on the monitor will be explained. Consider a case where the tuner module 20 functions as a PCI device.

At the start-up of the system, the bus manager allocates the same channel number (channel 1 in this case) to the tuner module 20 and media processor 16 and sets the tuner module 20 as a transmission-side (OUT) device on channel 1 and the media processor 16 as a reception-side (IN) device on channel 1.

Then, when the tuner module 20 starts to receive the AV stream, it begins to function as an initiator and executes a bus cycle for stream access. The AV stream is made up of MPEG-2 transport stream. The MPEG-2 transport stream is transferred directly from the CATV/satellite tuner (tuner module) 20 to the media processor 16 by stream access on the PCI bus 200 without passing through the system memory 12. The media processor 16 carries out the process of decoding and reproducing the MPEG-2 transport stream.

The display data obtained from the decoding and reproducing process is displayed on the display monitor via the VGA controller 17. Since a dedicated video bus is provided between the media processor 16 and VGA controller 17 (see FIG. 1), it is desirable that the media processor 16 should transfer the display data to the VGA controller 17 via the video bus. The reason is to make the traffic on the PCI bus 200 as little as possible.

Figure 8:
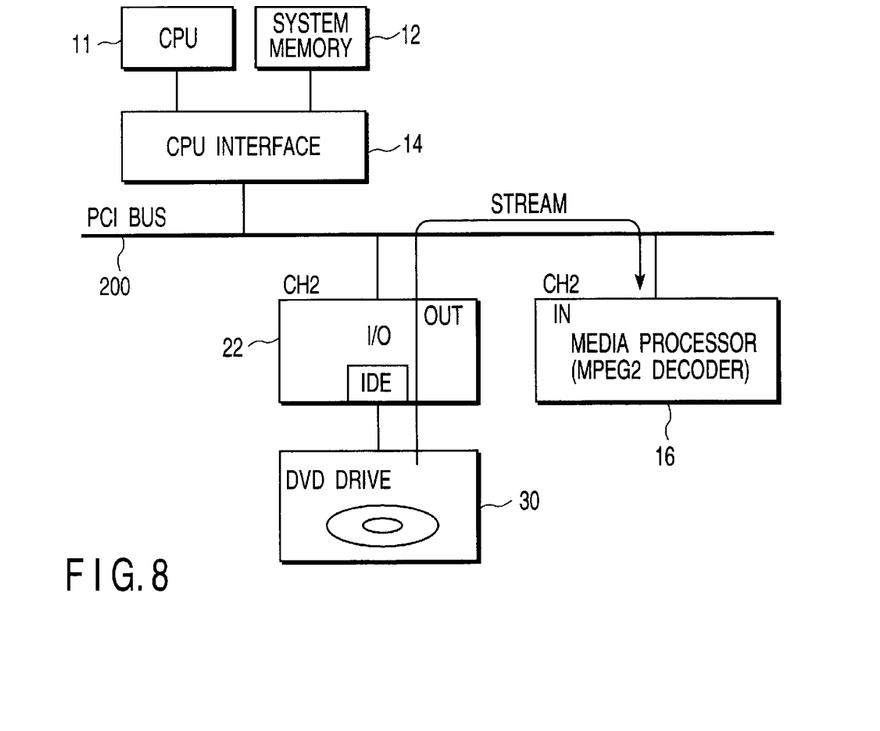
FIG. 8 shows another example of data transfer of AV stream using stream access in the embodiment.

Next, referring to FIG. 8, a case where the AV stream is read from the DVD drive 30, decoded, and displayed on the monitor will be explained.

At the start-up of the system, the bus manager allocates the same channel number (channel 2 in this case) to the I/O controller (IDE/ATAPI interface) 22 and media processor 16 and sets the IDE/ATAPI interface as a transmission-side (OUT) device on channel 2 and the media processor 16 as a reception-side (IN) device on channel 2.

Then, when the bus manager instructs the media processor 16 to receive and decode the AV stream, the media processor 16 functions as an initiator and starts a bus cycle for stream access. This causes the AV stream to be read from the DVD drive 30 via the I/O controller 22. The AV stream is transferred directly to the media processor 16 without passing through the system memory 12.

Figure 9:
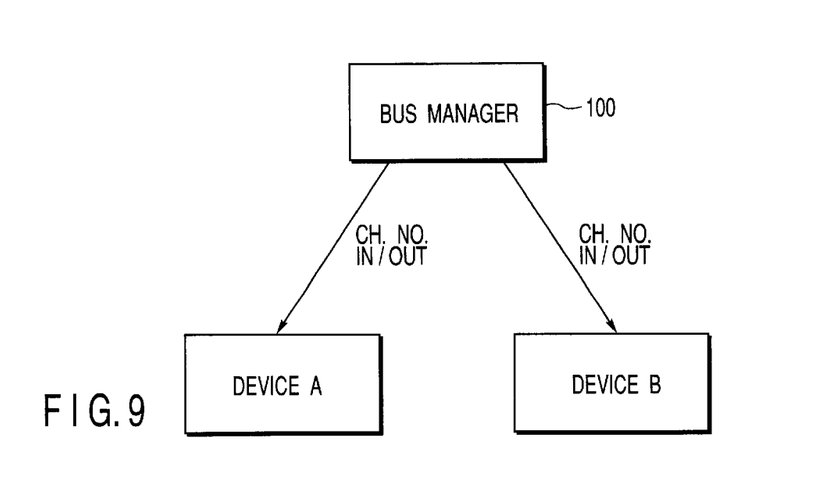
FIG. 9 shows the relationship between the bus manager and the PCI devices controlled by the bus manager used in the embodiment.

FIG. 9 shows the relationship between the bus manager 100 and PCI devices A and B controlled by the bus manager.

The bus manager 100 does setting so that the AV stream may be transferred by stream access. When the AV stream is transferred, the bus manager 100 sets the channel number (Ch No.) and input/output channel (IN/OUT) in the PCI devices A and B related to the transfer of the AV stream. As a result of this, the PCI bus cycle carried out between the PCI devices A and B is changed from the ordinary mode to the stream access mode, thereby carrying out a great band width transfer by double edge access.

As described above, with the system of the embodiment, increasing the band width according to the expansion of the PCI bus cycle makes it possible to implement a system suitable for the fusion of AV stream and computer data. Furthermore, the system of the embodiment may be used as a platform for not only a computer but also various digital information devices, including a set top box, a digital TV, and a game machine.

While in the embodiment, the stream access mode has been implemented as the functional expansion of the PCI bus, the present invention is not limited to the expansion of the PCI bus and enables a similar expansion of other buses.

Furthermore, the PCI bus dealing with only AV stream may be caused to transfer data by stream access at all times.

As described above, with the present invention, it is possible to transfer stream data efficiently on an existing bus, such as a PCI bus, and implement a system suitable for the fusion of AV stream and computer data.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A data processing system comprising:

a bus;

a plurality of devices connected to said bus; and means for executing data transfer between at least two of said plurality of devices via said bus, using one of a first bus cycle mode that enables data transfer with handshaking operation therebetween and a second bus cycle mode that enables stream data transfer without handshaking operation therebetween, wherein said executing means executes the stream data transfer between devices allocated a same channel number when using the second bus cycle mode, the channel number being outputted onto said bus from a device that starts a bus cycle.

2. A data processing system comprising:

a bus;

a plurality of devices connected to said bus; and means for executing data transfer between at least two of said plurality of devices via said bus, using one of a first bus cycle mode that enables data transfer with handshaking operation therebetween and a second bus cycle mode that enables stream data transfer without handshaking operation therebetween, wherein said executing means executes the stream data transfer in synchronization with both a rising edge and a falling edge of a clock when using the second bus cycle mode.

3. A data processing system comprising:

a bus;

a plurality of devices connected to said bus; and means for executing data transfer between at least two of said plurality of devices via said bus, using one of a first bus cycle mode that enables data transfer with handshaking operation therebetween and a second bus cycle mode that enables stream data transfer without handshaking operation therebetween, wherein said executing means executes the stream data transfer without transferring a ready signal for wait control between said at least two of said plurality of devices when using the second bus cycle mode.

4. A data processing system comprising:

a bus;

a plurality of devices connected to said bus; and means for executing data transfer between at least two of said plurality of devices via said bus, using one of a first bus cycle mode that enables data transfer with handshaking operation therebetween and a second bus cycle mode that enables stream data transfer without handshaking operation therebetween, wherein a bus cycle on said bus is constituted by an address phase that specifies a type of the bus cycle and an address, and one or more data phases following the address phase, and said executing means determines one of said first bus cycle mode and second bus cycle mode is used on the basis of a command in the address phase, the command being outputted onto said bus from a device that starts the bus cycle.

5. A data processing system comprising:

a bus;

a plurality of devices connected to said bus; and means for executing data transfer between at least two of said plurality of devices via said bus, using one of a first bus cycle mode that enables data transfer with handshaking operation therebetween and a second bus cycle mode that enables stream data transfer without handshaking operation therebetween, wherein the handshaking operation includes checking a state of a ready signal from one of the devices and determining an operation in a next clock.

6. A data processing system comprising:

a bus;

a plurality of devices connected to said bus;

a system memory; and means for executing data transfer between at least two of said plurality of devices via said bus, using one of a first bus cycle mode that enables data transfer through said system memory and a second bus cycle mode that enables stream data transfer without passing through said system memory, wherein said executing means executes the stream data transfer between devices allocated a same channel number when using the second bus cycle mode, the channel number being outputted onto said bus from a device that starts a bus cycle.

7. A data processing system comprising:
a bus;
a plurality of devices connected to said bus;
a system memory; and
means for executing data transfer between at least two of said plurality of devices via said bus, using one of a first bus cycle mode that enables data transfer through said system memory and a second bus cycle mode that enables stream data transfer without passing through said system memory,
wherein said executing means executes the stream data transfer in synchronization with both a rising edge and a falling edge of a clock when using the second bus cycle mode.

8. A data processing system comprising:
a bus;
a plurality of devices connected to said bus;
a system memory; and
means for executing data transfer between at least two of said plurality of devices via said bus, using one of a first bus cycle mode that enables data transfer through said system memory and a second bus cycle mode that enables stream data transfer without passing through said system memory,
wherein said executing means executes the stream data transfer without transferring a ready signal for wait control between said at least two of said plurality of devices when using the second bus cycle mode.

9. A data processing system comprising:
a bus;
a plurality of devices connected to said bus;
a system memory; and
means for executing data transfer between at least two of said plurality of devices via said bus, using one of a first bus cycle mode that enables data transfer through said system memory and a second bus cycle mode that enables stream data transfer without passing through said system memory,
wherein a bus cycle on said bus is constituted by an address phase that specifies a type of the bus cycle and an address, and one or more data phases following the address phase, and
said executing means determines one of said first bus cycle mode and second bus cycle mode is used on the basis of a command in the address phase, the command being outputted onto said bus from a device that starts the bus cycle.

10. A data processing system comprising:
a bus;
a plurality of devices connected to said bus;
a system memory; and
means for executing data transfer between at least two of said plurality of devices via said bus, using one of a first bus cycle mode that enables data transfer through said system memory and a second bus cycle mode that enables stream data transfer without passing through said system memory,
wherein passing through said memory includes checking a state of a ready signal from one of the devices and determining an operation in a next clock.

11. A bus cycle control method applied to a data processing system in which data is transferred between devices via a bus, wherein a bus cycle on the bus is constituted by an address phase that specifies a type of the bus cycle and an address, and one or more data phases following the address phase, said method comprising:
outputting onto the bus in said address phase a command indicating execution of an expansion bus cycle mode that enables stream data transfer without handshaking operation between the devices;
changing the bus cycle from an ordinary bus cycle mode that enables data transfer with handshaking operation between the devices to said expansion bus cycle mode; and
executing stream data transfer between devices via said bus without handshaking operation therebetween by said expansion bus cycle mode,
wherein the stream data transfer is executed between devices allocated a same channel number in said expansion bus cycle mode, the channel number being outputted onto the bus from a device that starts a bus cycle.

12. A bus cycle control method applied to a data processing system in which data is transferred between devices via a bus, wherein a bus cycle on the bus is constituted by an address phase that specifies a type of the bus cycle and an address, and one or more data phases following the address phase, said method comprising:
outputting onto the bus in said address phase a command indicating execution of an expansion bus cycle mode that enables stream data transfer without handshaking operation between the devices;
changing the bus cycle from an ordinary bus cycle mode that enables data transfer with handshaking operation between the devices to said expansion bus cycle mode; and
executing stream data transfer between devices via said bus without handshaking operation therebetween by said expansion bus cycle mode,
wherein the stream data transfer is executed in synchronization with both a rising edge and a falling edge of a clock in said expansion bus cycle mode.

13. A bus cycle control method applied to a data processing system in which data is transferred between devices via a bus, wherein a bus cycle on the bus is constituted by an address phase that specifies a type of the bus cycle and an address, and one or more data phases following the address phase, said method comprising:
outputting onto the bus in said address phase a command indicating execution of an expansion bus cycle mode that enables stream data transfer without handshaking operation between the devices;
changing the bus cycle from an ordinary bus cycle mode that enables data transfer with handshaking operation between the devices to said expansion bus cycle mode; and
executing stream data transfer between devices via said bus without handshaking operation therebetween by said expansion bus cycle mode,
wherein the stream data transfer is executed without transferring a ready signal for wait control between the devices in said expansion bus cycle mode.

* * * * *